United States Patent Office 3,661,814
Patented May 9, 1972

3,661,814
PHENOL-FORMALDEHYDE ADHESIVE RESINS
BY ADDITION OF POLYHYDRIC ALCOHOLS
Harry A. Smith and Erwin H. Kobel, Midland, Mich.,
assignors to The Dow Chemical Company, Midland,
Mich.
No Drawing. Filed Dec. 21, 1970, Ser. No. 100,503
Int. Cl. C08g 5/06, 5/18, 51/04
U.S. Cl. 260—17.2                                         10 Claims

ABSTRACT OF THE DISCLOSURE

Improved phenol-formaldehyde adhesive resins are obtained by premixing with aqueous formaldehyde about 0.5–10 weight percent based on formaldehyde of a polyhydric alcohol of Formula I:

$$R\text{-}(OC_mH_{2m})_aOH)_b$$

where R is a $C_4$–$C_{12}$ aliphatic group, m is 2–4, a is 0–3 and b is 4–8, and thereafter reacting the formaldehyde-polyhydric alcohol solution with phenol in the presence of alkali. Preferred are water-soluble sugars and related polyols including their $C_2$–$C_4$ alkylene oxide derivatives. The resulting thermosetting resole adhesive resins are particularly suitable for plywood glues.

BACKGROUND

Phenolic resole resins prepared by the alkaline condensation of phenol and aldehydes having long been used in plywood adhesives. Redfern, U.S. Re. 23,347 and Van Epps, U.S. 2,360,376 disclose the basic technology of the alkaline condensed resole resins employed as plywood adhesives. Booty, U.S. 2,462,252-3 add a water-soluble polyvinyl alcohol or methyl cellulose as a thickening agent to improve the storage stability of the adhesive resin. Barrentine, U.S. 2,862,897 uses as a thickener an alkali-soluble hydroxyethyl cellulose added during the resin preparation. Carstensen, U.S. 3,450,651 is typical of more recent developments. Chang and Kononenko, Adhesive Age, 5, 36–40 (1962) describe sucrose-modified phenolic resin adhesives in which a significant portion of the phenol normally used is replaced by sucrose.

In spite of significant advances in resin technology, changes in wood stock and production methods require adhesives tolerant to an ever wider variety of process variables. In normal plywood manufacture, wood veneers are coated with adhesive and assembled into multi-ply sheets which are held in open assembly at ambient temperature until a full press load is prepared for the hot press cure cycle, an operation that may require a half hour or more. During this open assembly time, the wood absorbs water from the adhesive glue. With a highly absorbent softwood, such as the spring wood portion of Southern yellow pine, rapid dehydration of the glue line occurs with resultant inadequate glue flow and penetration during the subsequent hot press cure. With a less absorptive wood, like Douglas fir, an aqueous glue line dries more slowly and too much flow and penetration may occur during hot pressing. Either condition causes substandard plywood.

Thus, a good plywood adhesive must be tolerant not only of the variable wood absorptivity, but must also be capable of producing specification grade plywood over a broad range of open assembly time. Other significant process variables include veneer moisture content and temperature, the temperature and humidity of the assembly area, the glue line spread, the press precure time, etc.

STATEMENT OF THE INVENTION

It has now been discovered that a plywood adhesive with increased tolerance to a wide variety of wood species and process conditions can be prepared by (A) premixing with aqueous formaldehyde about 0.5–10 weight percent based on formaldehyde of a polyhydric alcohol of Formula I and thereafter (B) reacting the formaldehyde-polyhydric alcohol solution with phenol in the presence of alkali to obtain a thermosetting phenolformaldehyde adhesive resin.

Premixing the aqueous formaldehyde and polyhydric alcohol in the absence of alkali and phenol is critical to the improved adhesive resin. A rapid reaction of formaldehyde and the polyhydric alcohol forms a formaldehyde complex or adduct which in the subsequent base-catalyzed reaction with phenol provides a significant increase in higher molecular weight species in the adhesive resin. These higher molecular weight species are present in colloidal dispersion and appear to give the plywood glue prepared from the resole resin its improved tolerance to wood species and assembly process variations.

GENERAL DESCRIPTION

Essential to the improved resole adhesive resin is the polyhydric alcohol premixed with the formaldehyde prior to addition of phenol and caustic. Required is a polyhydric alcohol of Formula I:

$$R\text{-}(OC_mH_{2m})_aOH)_b \qquad (I)$$

where R is a $C_4$–$C_{12}$ aliphatic group, m is 2–4, a is 0–3, and b is 4–8. To provide the essential nucleus for the higher molecular weight phenol-formaldehyde species, the polyhydric alcohol should have an average of at least about 4 OH groups per molecule. Water-soluble polyhydric alcohols including the ethylene oxide derivatives are particularly advantageous because of ready dispersion and dissolution in the aqueous formaldehyde solution.

Preferred polyhydric alcohols are water-soluble alcohols selected from the group consisting of (1) mono- and disaccharides and their α-methyl ethers, (2) pentaerythritol, (3) sugar alcohols of the formula $$HOCH_2(CHOH)_nCH_2OH$$

where n is 2–5, and (4) $C_2$–$C_4$ alkylene oxide derivatives of (1)–(3) having an average of up to about 3 moles of alkylene oxide per OH group.

Typical mono- and disaccharides are glucose, fructose, mannose and sucrose. Also suitable are their $C_2$–$C_3$ alkylene oxide derivatives prepared, for example, as described by Anderson U.S. Pats. 2,902,478 and 2,927,915 and having an average of up to about 3 moles of alkylene oxide per OH group. For example, a sucrose-ethylene oxide glycol ether with an average of about 2.3 moles ethylene oxide per OH group and a molecular weight of about 1300, or a sucrose-propylene oxide glycol ether with an average of about 1 mole of propylene oxide per OH group and a molecular weight of about 780 are particularly effective in the present process. Also the α-methyl ethers of these mono- and disaccharides, such as α-methylglucoside, can be used.

Pentaerythritol and its oxyalkylation products obtained, for example, by the process of Anderson U.S. Pats. 2,902,478 and 2,927,915 or Griffin U.S. Pat. 2,673,882 can be used.

Other suitable polyhydric alcohols are the sugar alcohols obtained by reduction of mono- and disaccharides to give polyols of the formula $HOCH_2(CHOH)_nCH_2OH$ where $n$ is 2–5, as described in J. A. Monich, "Alcohols," Reinhold, New York (1968), pp. 403–443. Typical of these polyols are pentitol, mannitol and sorbitol. Their $C_2$–$C_4$ alkylene oxide derivatives, such as described by Griffin U.S. Pat. 2,673,882, can be used up to an average of about 3 moles of alkylene oxide per OH group.

In addition mixtures of several polyhydric alcohols and their $C_2$–$C_4$ alkylene oxide derivatives as described, for example, by Bressler and Ward U.S. Pat. 2,990,376 can be used.

In practice, about 0.5–10 wt. percent of the polyhydric alcohol based on formaldehyde is premixed with aqueous 30–60% formaldehyde. Formation of the formaldehyde-polyhydric alcohol complex or adduct occurs rapidly at room temperature. As soon as the polyhydric alcohol is dissolved or thoroughly dispersed, the mixture can be used to prepare the resole adhesive.

While 30–60% aqueous formaldehyde is most suitable, other formaldehyde sources including paraformaldehyde can be used provided the polyol and formaldehyde are mixed together in aqueous solution prior to addition of phenol and alkali. As in conventional resole adhesives, phenol is generally used alone. However, mixtures with up to about 20 weight percent of other phenols including cresol, xylenol, and polyphenylphenol can be used.

The improved resole adhesive resin is obtained by reacting the premixed formaldehyde polyhydric alcohol solution with phenol in the presence of alkali in the normal manner for phenol-formaldehyde resole adhesive resins. Thus, the improved resin is prepared by using reactant mole ratios of formaldehyde/alkali/phenol of about 1.5–2.5/0.1–0.7/1.0 and cooking in a conventional manner at an elevated temperature, preferably about 70°–100° C., until an adhesive resin of desired viscosity is obtained. The alkali, preferably a strong base such as sodium or potassium hydroxide, is advantageously in two or more increments at predetermined reaction stages. Particularly good results are obtained using the general procedure of Booty U.S. 2,462,253 with about 1.7–2.0 moles of formaldehyde per mole phenol.

The resulting improved thermosetting phenol-formaldehyde adhesive resin can be formulated into a plywood glue mixture using standard procedures. Finely divided, inert fillers such as slate flour, wood flour, starch, clay, chalk, silicates, oat hulls, corn cobs, etc. are normally added along with a small amount of antifoam agent, such as diesel oil, and sufficient water to give a spreadable liquid glue formulation containing about 20–50 weight percent of the improved phenolformaldehyde adhesive resin and about 35–65 weight percent total solids. This glue can be applied to wood veneers by standard glue coating techniques using a spreader, felt roll, curtain coater, or even spray coating techniques. With the improved phenol formaldehyde adhesive resins, excellent wood adhesion is achieved at spread rates of about 50–90 lbs./M ft.$^2$ of double glue line. The optimum glue line spread depends on the specific veneer. With Douglas fir a spread of about 60–65 lbs./M ft.$^2$ is excellent, while Southern white pine requires about 65–70 lbs./M ft.$^2$ for best results.

The following examples illustrate further the present invention. Unless otherwise stated, all parts and percentages are by weight.

EXAMPLE 1.—PHENOL-FORMALDEHYDE ADHESIVE RESINS (A) The following standard resole resin formula and procedure was used to prepare a series of phenol-formaldehyde adhesive resins by the incremental caustic addition process of Booty U.S. 2,462,253. Resin advancement at the end of each stage was measured using standard Gardner-Holdt bubble tubes at 25° C. (ASTM Method D–1545–63).

|  | Formula, parts | Moles |
|---|---|---|
| 46.5% formaldehyde [1] | 348.7 | [3] 5.40 |
| Polyhydric alcohol | [2] 3.0 | |
| 90.0% phenol [1] | 313.1 | [3] 3.00 |
| First water | 88.7 | |
| First 50% NaOH [1] | 25.4 | [3] 0.32 |
| Antifoam [4] | 0.2 | |
| Second 50% NaOH [1] | 9.0 | [3] 0.11 |
| Second water | 169.3 | |
| Third 50% NaOH [1] | 42.6 | [3] 0.53 |
| Total | 1,000.0 | |

[1] Adjusted for actual concentration in first or second water addition.
[2] 1.85 wt. percent on HCHO.
[3] Mole ratios: 1.80 HCHO/0.32 NaOH/1.0 phenol.
[4] Tret-O-Lite antifoam (Petrolite Corp., St. Louis, Missouri).

(A) Control resin without polyhydric alcohol (1) The formaldehyde, phenol, and first water were mixed and the temperature adjusted to 25° C. Then the first NaOH was added and the temperature increased to 85° C. at a uniform rate in 100 minutes. Then the antifoam was added and the mixture held at 85° C. for about 110 minutes to a Stage 1 viscosity of I (about 225 cs.) determined at 25° C.

(2) The resin mixture was cooled to 80° C. and held at 80° C. for about 80 minutes to a Stage 2 viscosity of X (about 1290 cs.).

(3) The second NaOH was added and reaction at 80° C. continued for about another 65 minutes to a Stage 3 viscosity of $Z_5Z_6$ (about 12,350 cs.).

(4) The second water and third NaOH were added and the resin mixture held at 80° C. for about another 50 minutes before cooling rapidly to room temperature, Stage 4 viscosity of Z (about 2270 cs.). This resole resin contained about 40% total solids.

(B) Resins with polyhydric alcohol added to formaldehyde

To 348.7 parts of 46.5% formaldehyde was added 3.0 parts (1.85 wt. percent on HCHO) of the polyhydric alcohol and the mixture stirred briefly at room temperature to obtain complete dissolution. Then the phenol and first water were added and the temperature adjusted to 25° C. as in Example 1(A). The first NaOH was added and the resole resin adhesive prepartion was completed using the same multistep addition, temperature and cook schedule as in 1(A).

(C) GPC analysis of resole resins

Resole resin samples were freeze-dried and then dissolved in dimethylformamide as 1 wet. percent solutions for gel permeation chromatograph (GPC). A $10^4$ A. "Styrogel" column (Water's Associates, Farmingham, Mass.) was used to obtain a molecular weight profile of the resin. This column excludes species with a molecular weight greater than 1300 (very high) and strongly absorbs species with a molecular weight below about 400. The molecular weight profile of the excluded and eluted species is conveniently reported by the weight ratios of very high, high, medium, and low molecular weight species.

Table 1 presents typical data for the control resin of Example 1(A) and for several improved resins prepared by the process of Example 1(B). Note the significantly higher ratios for higher molecular weight species in the resins prepared by premixing the polyhydric alcohol and formaldehyde.

TABLE 1.—RESOLE RESINS CONTAINING POLYHYDRIC ALCOHOLS

| Resin | Polyhydric alcohol | Gardner viscosity | GPC analysis | | |
|---|---|---|---|---|---|
| | | | Very high total | High/ medium | Medium/ low |
| 1A | None | YZ (2,000 cs.) | 0.09 | 0.13 | 2.7 |
| 1B-1 | Sucrose | Z (2,250 cs.) | 0.16 | 0.17 | 2.9 |
| 1B-2 | Sucrose.EO [a] | Z¹ (2,650 cs.) | 0.12 | 0.15 | 3.2 |
| 1B-3 | Sucrose.PO [b] | ZZ¹ (2,500 cs.) | 0.17 | 0.21 | 3.1 |

[a] A commercial sucrose-ethylene oxide product (M.W.=1312).
[b] A commercial sucrose-propylene oxide product (M.W.=864).

EXAMPLE 2.—ADHESIVE RESIN PERFORMANCE (A) Comparative performance of the phenolformaldehyde resole adhesive resins of Example 1 were evaluated using ASTM Method D-903-49 (1965) for determining the peel strength of the cured adhesive bond using standard test specimens with a wide 30 oz. cotton duck strip as the flexible strip bonded to a rigid member of each test specimen. Table 2 reports typical results on the cure time at 150° C. required to reach a peel strength of 2.5 lbs./inch. width and on the open assembly time tolerance as measured by the lbs. peel adhesion achieved after curing at 150° C. for 5 minutes following a 5, 30 or 60 minute open assembly time. The shortened cure time and improved peel adhesion with short open assembly time evident with the polyhydric alcohol resins of Example 1(B) are significant factors in the commercial was of these improved adhesive resins.

TABLE 2.—PEEL TEST FOR CURE RATE AND OPEN ASSEMBLY TIME

| Resin | Polyhydric alcohol | Cure time,[a], min. | Open assembly time tolerance —[b] | | |
|---|---|---|---|---|---|
| | | | 5 min. | 30 min. | 60 min. |
| 1A | None | 5 | 0.9 | >5 | >5 |
| 1B-1 | Sucrose | 4 | 1.7 | >5 | >5 |
| 1B-2 | Sucrose.EO | 4 | 1.9 | 3.2 | >5 |
| 1B-3 | Sucrose.PO | 4 | 2.1 | >5 | >5 |

[a] Cure time at 150° C. to 2.5 lbs./in. width peel.
[b] Lbs./inch width peel adhesion.

(B) The sucrose-alkylene oxide modified adhesive resins 1B-2 and 1B-3 were used in standard Southern pine adhesive glue formulations containing about 63 wt. percent resin to prepare three-ply ⅜″ random Southern pine plywood panels from stock veneer containing 4.7–5.3% moisture. A 68–72 lbs./1000 ft. double glue line spread was used and the panels were pressed 2 panels per opening at 285° F. and 200 p.s.i. The resulting test panels were hot stacked overnight. Then standard shear chips were cut and subjected to the vacuum pressure treatment specified by the American Plywood Association (Par. 4.4.2 PS 1-66, U.S. Product Standard for Softwood Plywood). Test results are expressed as break strength and percent wood failure, a high percent wood failure indicating superior glue line strength.

Typical test results given in Table 3 show the improved performance of the improved adhesive resin containing the sucrose-alkylene oxide additive, particularly with short assembly and press times.

TABLE 3.—SOUTHERN PINE PLYWOOD TEST PANELS

| Test | Resin [a] | Test results [b]: p.s.i.—(percent wood failure) | | |
|---|---|---|---|---|
| | | CAT 1-2 min.; PT 7.5 min. | CAT 1-2 min.; PT 8.5 min. | CAT 15 min.; PT 8.5 min. |
| 3-1 | 1A | 144 (60) | 189 (79) | 162 (89) |
| 3-2 | 1B-2 | 170 (82) | 190 (87) | 165 (87) |
| 3-3 | 1B-3 | 212 (78) | 203 (86) | 197 (85) |

[a] 1A—Control; 1B-2—Sucrose.EO; 1B-3—Sucrose.PO.
[b] CAT—Closed assembly time; PT—Press time.

(C) Similar advantageous results are obtained with sorbitol and other polyhydric alcohols premixed with formaldehyde. These improved phenol-formaldehyde resins are useful in a variety of applications requiring a thermosetting adhesive and particularly as the adhesive resin component of plywood glues.

We claim:

1. In a process for preparing a thermosetting phenol-formaldehyde adhesive resole resin by reaction of phenol and formaldehyde in the presence of alkali, the improvement which comprises:

(A) premixing with aqueous formaldehyde about 0.5–10 weight percent based on formaldehyde of a polyhydric alcohol of Formula I $$R\text{—}(\!(OC_mH_{2m})_aOH)_b \qquad (I)$$

where R is a $C_4$–$C_{12}$ aliphatic group, $m$ is 2–4, $a$ is 0–3 and $b$ is 4–8;

and thereafter (B) reacting the formaldehyde-polyhydric alcohol solution with phenol in the presence of alkali to obtain a thermosetting phenol-formaldehyde adhesive resin.

2. The process of claim 1 wherein the polyhydric alcohol is a water-soluble alcohol selected from the group consisting of (1) mono- and disaccharides and their α-methyl ethers, (2) pentaerythritol, (3) sugar alcohols of the formula $HOCH_2(CHOH)_nCH_2OH$ where $n$ is 2–5, and (4) $C_2$–$C_4$ alkylene oxide derivatives of (1)–(3) having an average of up to about 3 moles of alkylene oxide per OH group.

3. The process of claim 1 wherein the polyhydric alcohol is sucrose.

4. The process of claim 1 where the polyhydric alcohol is a $C_2$–$C_4$ alkylene oxide derivative of sucrose.

5. The process of claim 1 where the polyhydric alcohol is sorbitol.

6. The process of claim 1 where the polyhydric alcohol is a $C_2$–$C_4$ alkylene oxide derivative of sorbitol.

7. The process of claim 1 where the formaldehyde-polyhydric alcohol solution is reacted with phenol and alkali in a ratio of about 1.5–2.5 moles formaldehyde and about 0.1–0.7 mole alkali per mole phenol.

8. The process of claim 7 where the formaldehyde-polyhydric alcohol solution is reacted with phenol in the presence of sodium hydroxide at about 70°–100° C. in a ratio of about 1.7–2.0 moles formaldehyde per mole phenol.

9. A thermosetting phenol-formaldehyde adhesive resole resin prepared by the process of claim 1.

10. An adhesive glue suitable for plywood manufacture containing as the adhesive resin a thermosetting phenol-formaldehyde adhesive resole resin prepared by the process of claim 1.

References Cited

UNITED STATES PATENTS

| 1,668,444 | 5/1928 | Aiken | 260—58 |
| 2,902,470 | 9/1959 | Kress | 260—47 |
| 3,025,255 | 3/1962 | Lambuth | 260—29.3 |
| 3,156,670 | 11/1964 | Soldatos | 260—58 |

FOREIGN PATENTS

| 16,528 | 1/1909 | Great Britain | 260—58 |

OTHER REFERENCES

Chem. Abst., 70:107129w, Marzec, "Water-Soluble Modified Phenolic Resin" (Polish Pat. 55,006—March 1968).

HAROLD D. ANDERSON, Primary Examiner

E. WOODBERRY, Assistant Examiner

U.S. Cl. X.R.

161—262; 260—38, 58